(12) United States Patent
Oakley

(10) Patent No.: US 6,822,667 B1
(45) Date of Patent: Nov. 23, 2004

(54) MULTI-CHANNEL OPTICAL RECORDING USING VCSEL ARRAYS

(75) Inventor: William S. Oakley, Burlingame, CA (US)

(73) Assignee: Imation Corp., Oakdale, MN (US)

( * ) Notice: Subject to any disclaimer, the term of this patent is extended or adjusted under 35 U.S.C. 154(b) by 408 days.

(21) Appl. No.: 09/602,345

(22) Filed: Jun. 23, 2000

Related U.S. Application Data

(60) Provisional application No. 60/142,548, filed on Jul. 7, 1999.

(51) Int. Cl.[7] .............................. B41J 2/45; B41J 2/385
(52) U.S. Cl. ....................................... 347/238; 347/130
(58) Field of Search ................................ 347/224, 238, 347/233, 234, 248, 130, 241, 256; 359/621; 369/44.31, 44.38, 110, 121, 53.2, 97, 124.02, 124.03, 13.3, 44.29, 112.26, 13.05, 3.24, 13.28, 13.29; 360/104; 365/189.01, 189.03

(56) References Cited

U.S. PATENT DOCUMENTS

| | | | | |
|---|---|---|---|---|
| 5,365,535 A | * | 11/1994 | Yamaguchi et al. | 369/121 |
| 5,508,990 A | * | 4/1996 | Nagasaki et al. | 369/124.02 |
| 5,524,105 A | * | 6/1996 | Brewen et al. | 369/97 |
| 5,526,182 A | * | 6/1996 | Jewell et al. | 359/621 |
| 5,619,488 A | * | 4/1997 | Ota et al. | 369/112.26 |
| 5,703,856 A | * | 12/1997 | Hayashi et al. | 369/53.2 |
| 6,078,468 A | * | 6/2000 | Fiske | 360/104 |
| 6,084,848 A | * | 7/2000 | Goto | 369/121 |

* cited by examiner

Primary Examiner—Hai Pham
(74) Attorney, Agent, or Firm—Eric D. Levinson

(57) ABSTRACT

A multi-beam optical recording system having an array of light sources, such as Vertical Cavity Surface Emitting Lasers (VCSEL), oriented to the direction of motion of an optically sensitive recording medium such that each light source forms a separate written track. In another embodiment, a multi-beam optical recording system having a first array and a second array of light sources, such as VCSELs, oriented so that an objective lens focuses the output from each of the arrays in the direction of an optically sensitive recording medium. In a further embodiment, the first array of light sources may be an optical recording array, and the second array of light source may be an optical playback array.

20 Claims, 4 Drawing Sheets

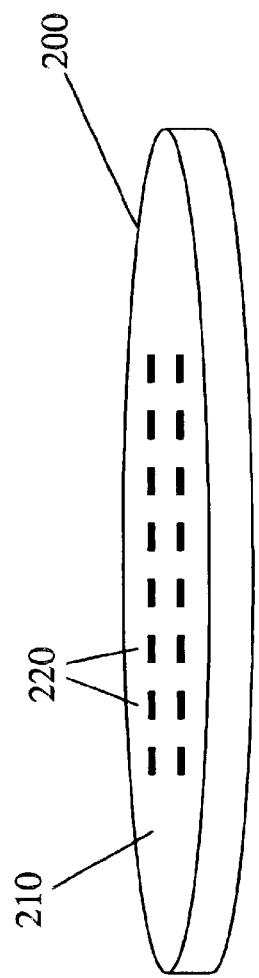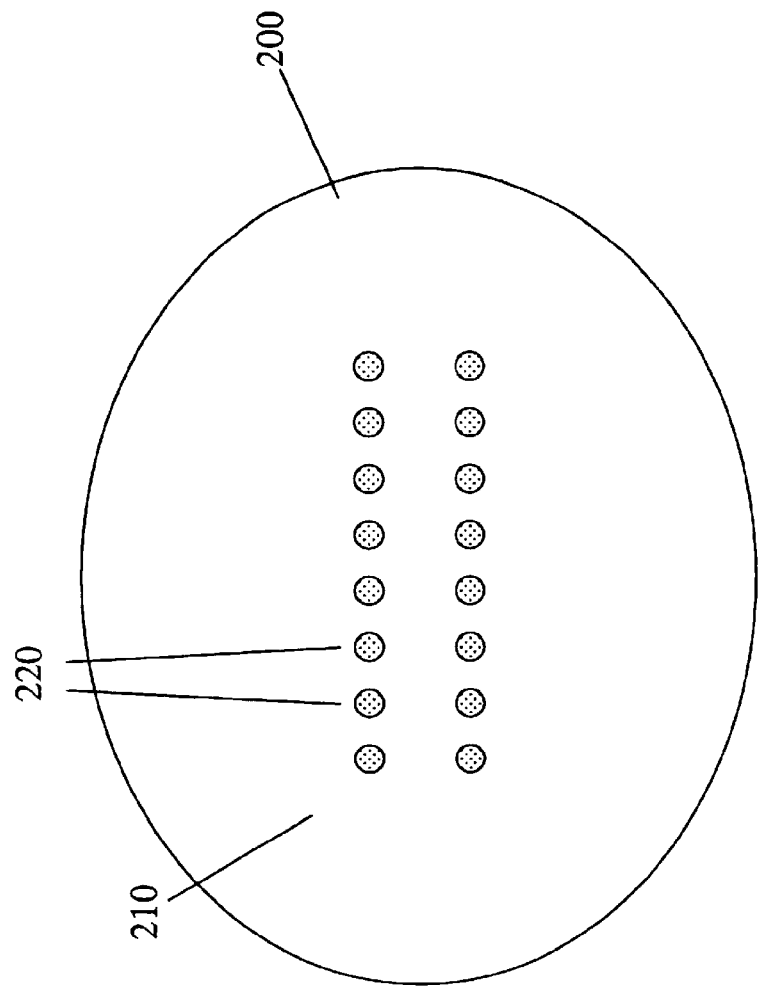
Figure 2A
Figure 2B

MULTI-CHANNEL OPTICAL RECORDING USING VCSEL ARRAYS

This application claims the benefit of U.S. Provisional Application Ser. No. 60/142,548, filed Jul. 7, 1999, entitled "Multi-channel Optical Recording Using VCSEL Arrays" by William S. Oakley.

BACKGROUND OF THE INVENTION

1. Field of the Invention

The present invention relates to optical recording systems.

2. Background Information

Optical based systems use light beams to convey and process information. Light beams provide distinct advantages over electrical signals such as higher bandwidth and faster propagation speed. In optical based systems, a light source, such as a laser, is modulated to convey the desired information. By using digital or analog modulation of light beams, optical based systems can be used in a variety of applications, such as optical signal processing and data storage.

Optical recording systems can provide for faster writing of large amounts of data, especially if multiple light sources are used. However, using multiple light sources can increase the complexity and cost of an optical recording system. Thus, it is desirable to have a relatively simple and inexpensive high speed optical recording system.

SUMMARY OF THE INVENTION

The present invention provides an optical recording system having an array of modulatable light sources. An objective lens is positioned relative to the array of modulatable light sources to allow the objective lens to focus at least one light beam from the array of modulatable light sources on a target medium.

In one embodiment of the present invention, the array of modulatable light sources includes an array of Vertical Cavity Surface Emitting Lasers (VCSEL), where each VCSEL of the VCSEL array is capable of writing a separate track on the target medium.

In another embodiment of the present invention, the array of modulatable light sources includes at least one line of modulatable light sources positioned at an angle relative to a direction of movement of said target medium. Each modulatable light source of the line of modulatable light sources is associated with a separate path on the target medium.

Additional features and benefits of the present invention will become apparent upon review of the following description.

BRIEF DESCRIPTION OF THE DRAWINGS

Various embodiments of the present invention will be described in detail with reference to the following drawings. The present invention is illustrated by way of example and not limitation in the accompanying figures.

FIG. 2A illustrates a side perspective view of a VCSEL array embedded in a substrate in accordance with the teachings of the present invention.

FIG. 2B illustrates a top view of the VCSEL array shown in FIG. 2A.

DETAILED DESCRIPTION

The following description provides embodiments of the present invention. However, it will be appreciated that other embodiments of the present invention will become apparent to those of ordinary skill in the art upon examination of this description. Thus, the present description and accompanying drawings are for purposes of illustration and are not to be used to construe the invention in a restrictive manner.

Figure 1:
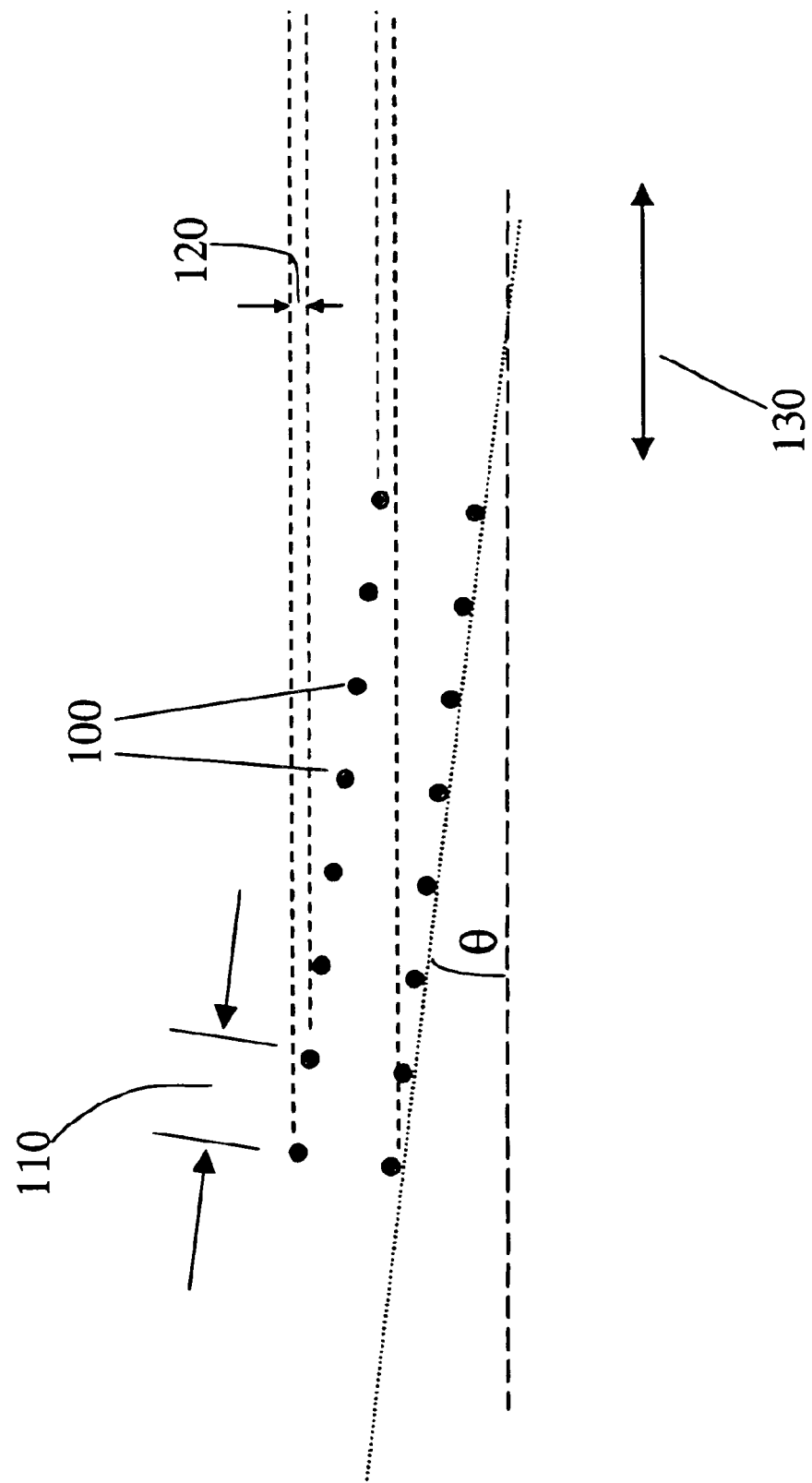
FIG. 1 illustrates a top view of an array of light sources tilted at an angle to the direction of movement of a target medium in accordance with the teachings of the present invention.

Multi-beam optical signal or data recording onto a target medium, such as tape or disc media, may be implemented in accordance with one embodiment of the present invention by use of an array of light sources, such as Vertical Cavity Surface Emitting an Lasers (VCSEL), in an orientation as shown in FIG. 1. A VCSEL is a semiconductor laser diode that emits light vertically from the surface of a substrate, such as a semiconductor wafer. VCSELs are commonly known and can be fabricated using standard microelectronic fabrication techniques. The two dimensional array of regularly spaced light sources 100 is oriented at a slight angle θ to the direction of motion 130 of the target medium as shown in FIG. 1 such that closely spaced tracks can be written on the target medium. It should be noted that light sources 100 are shown in a top-down view. Adjacent light sources 100 are spaced along a row or line by a center-to-center distance 110. Because each line of light sources 100 is positioned at an angle θ to the direction of motion 130 of the target medium, each light source 100 can write a separate, non-overlapping track on the target medium. Recorded data patterns may be achieved on each individual track by modulating each light source 100 independently.

The vertical spacing 120 between adjacent light sources 100, and hence the written track spacing, may be adjusted by changing tilt angle θ. It should be noted that certain tilt angles θ may result in overlapping written tracks on the target medium depending on the spacing 110 between adjacent light sources 100. Although FIG. 1 illustrates 16 light sources in a 2×8 array, it is appreciated that any number of light sources in many different array configurations may be implemented within the scope of the present invention.

In one embodiment of the present invention, light sources 100 have a spacing 110 of approximately 240 microns on the substrate, which may be reduced by, for it example, approximately 30×by imaging onto the target medium, thereby providing an imaged array with nominal 8 micron spacing on beam centers. A tilt angle θ of 7 degrees further reduces the written track spacing to approximately one micron. A spacing 110 of at least 40 microns may be used to prevent interference between light in beams emitted by adjacent light sources 100.

FIGS. 2A and 2B illustrate a side perspective view and a top view, respectively, of an array of VCSELs 220 embedded in a substrate 200. Each VCSEL 220 emits a light beam vertically from the surface 210 of substrate 200. Substrate 200 may be a semiconductor wafer of any suitable shape and size. In FIG. 2B, VCSELs 220 are shown in a non-angled orientation on substrate 200. Thus, to permit each VCSEL 220 to write a separate, non-overlapping track on a target medium, substrate 200 may be rotated to orient the light beams emitted by VCSELs 220 at an appropriate angle to the direction of motion of the target medium.

Figure 2C:
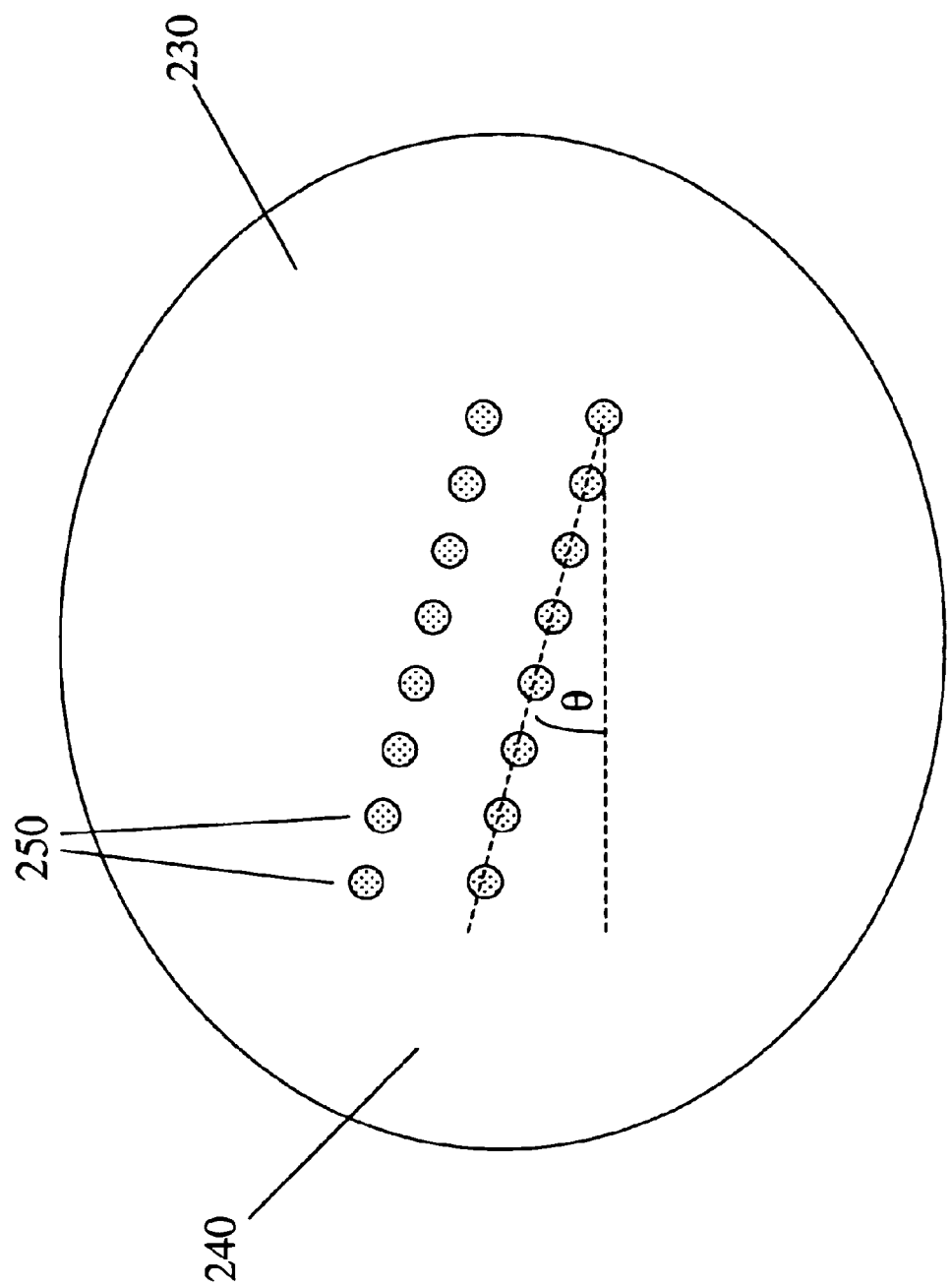
FIG. 2C illustrates a top view of a VCSEL array embedded in a substrate at an angle in accordance with the teachings of the present invention.

In FIG. 2C, VCSELs 250 are embedded in substrate 230 at an angle θ. Specifically, the array of VCSELs 250 features rows or lines of VCSELs 250, and each line is positioned at an angle θ to the direction of motion of the target medium. Each VCSEL 250 emits a light beam vertically from the surface 240 of substrate 230. Because VCSELs 250 are already oriented at an angle θ, it is not necessary to rotate substrate 230 to achieve a desired write pattern. However, it is appreciated that both the VCSEL substrate and the VCSEL array may be positioned at an angle to the direction of motion of the target medium in order achieve a desired write pattern on the target medium.

Figure 3A:
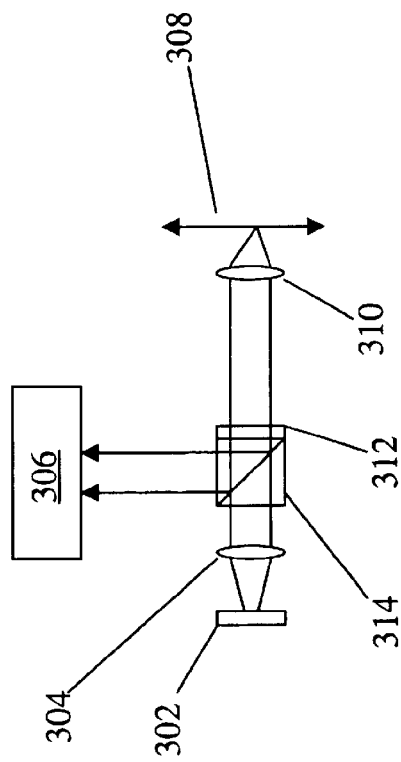
FIG. 3A illustrates generally a diagram of an embodiment of an optical recording system in accordance with the teachings of the present invention.

FIG. 3A illustrates generally a diagram of an embodiment of an optical recording system using a VCSEL array 302, which may be positioned at an angle as described above with respect to FIGS. 1, 2B and 2C. The VCSEL outputs pass through a collimating lens 304 and are optically polarized after passing through a polarizing beam-splitter 314. Alternatively, the VCSEL outputs may be polarized by the laser emitter design. The polarized light beams then pass through a circularly in polarizing element 312, such as a quarter wave plate, coupled to or adjacent polarizing beam-splitter 314. After exiting element 312, the light beams impinge on a target medium 308 via a focusing objective lens 310. Lens 310 is maintained in a desired focal and tracking position by electromechanical servos (not shown) driven by optical signal feedback via system detectors 306. Element 312 causes the light impinging on target medium 308 to be circularly polarized, and the light reflecting from target medium 308 travels back through element 312 and beam-splitter 314 and is placed in a polarization state such that it is reflected to detection system 306 rather than traveling back to VCSEL array 302.

A second VCSEL array operating in a continuous mode can provide read-after-write capability. This second array can be on a separate substrate, or on the same substrate as the writing VCSEL array, and may be interspersed with the writing VCSELs.

Figure 3B:
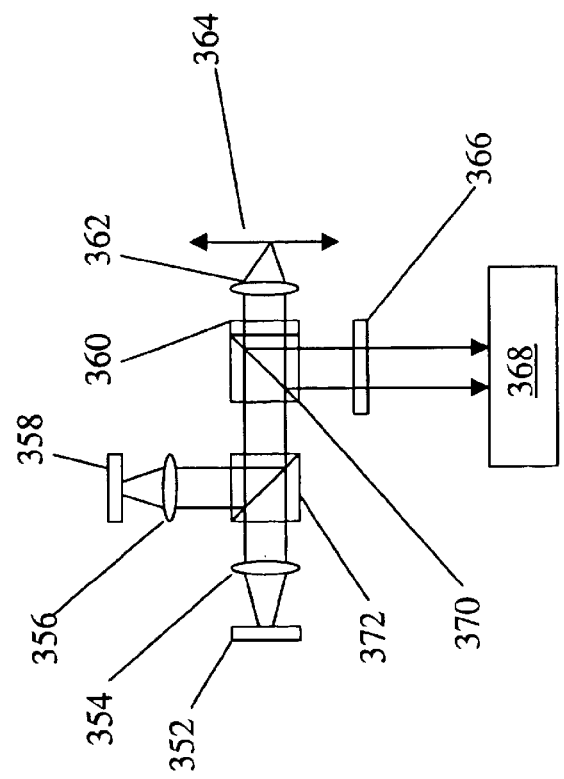
FIG. 3B illustrates generally a diagram of another embodiment of an optical recording system in accordance with the teachings of the present invention.

For example, FIG. 3B illustrates generally a diagram of an optical recording system using two VCSEL arrays 352 and 358, each of which may be positioned at an angle as described above with respect to FIGS. 1, 2B and 2C. The system may employ one VCSEL array 352 for writing and one VCSEL array 358 for reading. The writing VCSEL array 352 may project light beams having one wavelength, and the reading VCSEL array 358 may project light beams having a slightly different wavelength, but both arrays may have the same array spacing. The writing VCSELs may be modulated individually to form the data patterns and the reading VCSELs may be operated in a continuous mode when reading is required. Both VCSEL arrays 352 and 358 may operate simultaneously in a read-after-write mode.

In the two-array configuration shown in FIG. 3B, a focusing objective lens 362 is sufficiently achromatic to cover different wavelengths so that both VCSEL arrays 352 and 358 focus in the same plane at a target medium 364 with the same magnification. The light beams of VCSEL arrays 352 and 358 having slightly differing wavelengths but similar polarization states are combined through a dichroic polarizing beam-splitter 372 after passing through collimating lenses 354 and 356, respectively. The light beams of writing VCSEL array 352 pass directly through the dichroic polarizing beam-splitter 372 and those of the reading VCSEL array 358 are reflected from the beam-splitter internal dichroic surface. The combined beams exit the dichroic polarizing beam-splitter 372 with the same polarization state and pass through a second polarizing beam-splitter 370 and circularly polarizing plate 360 to target medium 364 via focusing objective lens 362. Lens 362 is maintained in a desired focal and tracking position by electromechanical servos (not shown) driven by optical signal feedback via system detectors 368. On being reflected from target medium 364 and back through plate 360, the light beams have their polarization rotated 90 degrees so that they are reflected from beam-splitter 370 to detection system 368 rather than traveling back to their sources. A filter 366 is placed in the path of the light beams reflected from beam-splitter 370 to remove unwanted write energy and allow the read beams to pass to detection system 368 where data is read out.

In the foregoing detailed description, the apparatus and method of the present invention have been described with reference to specific exemplary embodiments. However, it will be evident that various modifications and changes may be made without departing from the broader scope and spirit of the present invention. The present specification and figures are accordingly to be regarded as illustrative rather than restrictive.

What is claimed is:

1. An optical recording system comprising:
    a writing array of modulatable light sources formed on a substrate:
    a reading array of modulatable light sources formed on a separate substrate; and
    an objective lens positioned relative to said writing array and said reading array of modulatable light sources such that said objective lens is capable of focusing at least one light beam from each of said writing array and said reading array of modulatable sources on a target medium.

2. The optical recording system of claim 1 wherein said writing array of modulatable light sources comprises a first Vertical Cavity Surface Emitting Laser (VCSEL) array and said reading array of modulatable light sources comprises a second VCSEL array.

3. The optical recording system of claim 2, further comprising a detector to receive a set of one or more beams emanating from the reading array and reflected from the target medium.

4. The optical recording system of claim 3 wherein each VCSEL of said first VCSEL array is capable of writing a separate track on said target medium.

5. The optical recording system of claim 1 wherein said modulatable light sources are spaced at regular intervals.

6. The optical recording system of claim 5 wherein said regular intervals comprise center-to-center distances of at least approximately 40 microns.

7. The optical recording system of claim 1 wherein said writing array of modulatable light sources comprise at least one line of modulatable light sources positioned at an average angle relative to a direction of movement of said target medium.

8. The optical recording system of claim 7 wherein each modulatable light source of said at least one line of modulatable light sources is associated with a separate path on said target medium.

9. The optical recording system of claim 1 further comprising:
    a polarizing beam-splitter located between said writing and said reading array of modulatable light sources and said objective lens; and a circularly polarizing element located adjacent to said polarizing beam-splitter.

10. The optical recording system of claim 9 wherein said circuitry polarizing element comprises a quarter wave plate.

11. The optical recording system comprising:

a first Vertical Cavity Surface Emitting Layer (VCSEL) array comprising a writing array;

a second VCSEL array comprising a reading array;

an objective lens is located in an optical path of each of said first and second VCSEL arrays, wherein said objective lens is capable of focusing at least one light beam from each of said first and second VCSEL arrays on a target medium; and a detector to receive a set of one or more beams, the set of one or more beams having emanated from the second VCSEL array and the set of one or more beams having reflected from the target medium;

wherein the first VCSEL array is located on a first substrate, and the second VCSEL array is located on a second substrate, wherein the first substrate is separate from the second substrate.

12. The optical recording system of claim 11 wherein said first VCSEL array comprises a plurality of individually modulatable light sources and said second VCSEL array comprises a plurality of continuously operable light sources.

13. The optical recording system of claim 11 wherein:

said first VCSEL army is capable of emitting a plurality of light beams having a first wavelength;

said second VCSEL array is capable of emitting a plurality of light beams having a second wavelength different from said first wavelength; and said objective lens is achromatic.

14. The optical recording system of claim 11 wherein each VCSEL of said first VCSEL is capable of writing a separate track on said target medium.

15. The optical recording system of claim 14 wherein said first VCSEL array is positioned at an angle relative to a direction of movement of said target medium.

16. The optical recording system of claim 11, further comprising:

a first polarizing beam-splitter located between said first VCSEL army and said objective lens;

a second polarizing beam-splitter located between said first polarizing beam-splitter and said objective lens; and a circularly polarizing plate located adjacent said second polarizing beam-splitter.

17. The optical recording system of claim 16 wherein said polarizing beam-splitter comprises a dichroic polarizing beam-splitter.

18. An optical recording system comprising:

a writing array of Vertical Cavity Surface Emitting Lasers (VCSELs);

a reading array of VCSELs;

a dichroic polarizing beam-splitter positioned to receive a plurality of light beams from each of said writing array of VCSELs and said reading array of VCSELs;

a polarizing beam-splitter positioned to receive said light beams upon said light beams exiting said dichroic polarizing beam-splitter;

a circuitry polarizing plate coupled to an exit face of said polarizing beam-splitter;

an achromatic objective lens positioned to receive said light beams upon said light beams exiting said circularly polarizing plate, wherein said objective lens is capable of focusing said light beams on a target medium;

at least one adjustment device coupled to said objective lens to adjust a position of said objective lens;

a detection system positioned to receive said light beams upon said light beams reflecting from said target medium, said detection system capable of providing data to control said at least one adjustment device.

19. An optical recording system comprising:

a multidimensional writing array of modulatable light sources formed on a first substrate;

a multidimensional reading array of modulatable light sources formed on a second substrate that is separate from the firm substrate; and an objective lens positioned relative to said writing array and said reading array of modulatable light sources such that said object lens is capable of focusing at least one light beam from each of said writing array and said array of modulatable light sources on a target medium.

20. An optical recording system comprising:

a multidimensional writing array of modulatable light sources formed on a first substrate;

a reading array of modulatable light sources formed on a second substrate that is separate from the first substrate; and an objective lens positioned to said writing array and said reading array of modulatable light sources such that said objective lens is capable of focusing at least one light beam from each of said writing array and said reading array of modulatable light sources on a target medium;

wherein the writing array and reading array are angled on a substrate such that each modulatable light source of the writing array can write a separate track on the target medium.

* * * * *